US011936019B2

United States Patent
Yahia

(10) Patent No.: US 11,936,019 B2
(45) Date of Patent: Mar. 19, 2024

(54) HEAT TRANSFER LIQUID LOOP FOR A VEHICLE

(71) Applicant: Valeo Systemes Thermiques, Le Mesnil Saint-Denis (FR)

(72) Inventor: Mohamed Yahia, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 447 days.

(21) Appl. No.: 17/279,926

(22) PCT Filed: Sep. 26, 2019

(86) PCT No.: PCT/FR2019/052277
§ 371 (c)(1),
(2) Date: Mar. 25, 2021

(87) PCT Pub. No.: WO2020/065231
PCT Pub. Date: Apr. 2, 2020

(65) Prior Publication Data
US 2021/0339621 A1     Nov. 4, 2021

(30) Foreign Application Priority Data
Sep. 26, 2018    (FR) ...................................... 1858792

(51) Int. Cl.
*H01M 10/625*     (2014.01)
*B60K 1/00*        (2006.01)
(Continued)

(52) U.S. Cl.
CPC ............ *H01M 10/625* (2015.04); *B60K 1/00* (2013.01); *B60K 11/02* (2013.01); *B60L 3/0061* (2013.01);
(Continued)

(58) Field of Classification Search
CPC .... H01M 10/625; B60L 58/26; B60L 3/0061; B60L 2240/36; B60L 2240/425;
(Continued)

(56) References Cited

U.S. PATENT DOCUMENTS

| | | | | |
|---|---|---|---|---|
| 2008/0028768 A1* | 2/2008 | Goenka | .............. | B60H 1/00478 62/3.61 |
| 2013/0255601 A1* | 10/2013 | Gooden | ................ | F28D 1/0417 123/41.31 |
| 2015/0298538 A1* | 10/2015 | Janarthanam | ............. | F01P 3/18 165/145 |

FOREIGN PATENT DOCUMENTS

| | | |
|---|---|---|
| DE | 102015206783 A1 | 10/2015 |
| EP | 3070772 A2 | 9/2016 |
| FR | 2975344 A1 | 11/2012 |

OTHER PUBLICATIONS

International Search Report and Written Opinion in corresponding International Application No. PCT/FR2019/052277, dated Feb. 5, 2020 (11 pages).

* cited by examiner

*Primary Examiner* — Justin M Jonaitis

(57) ABSTRACT

The invention relates to a loop (14) for heat transfer liquid (48) for a vehicle comprising a first network (70) and a second network (71), a means (42) for circulating the heat transfer liquid (48), a first heat exchanger (100) configured to be thermally coupled to a first element (40) of an electric drivetrain of the vehicle, a means (72) for moving the heat transfer liquid (48), a second heat exchanger (200) configured to be thermally coupled to a second element (49) and a radiator (51) arranged to be traversed by an external air flow (EF), the radiator (51) comprising a first cooling zone (74) and a second cooling zone (75), a first output (54) of the radiator (51) being connected to the first heat exchanger (100) and a second output (53) of the radiator (51) being (Continued)

Figure 1:
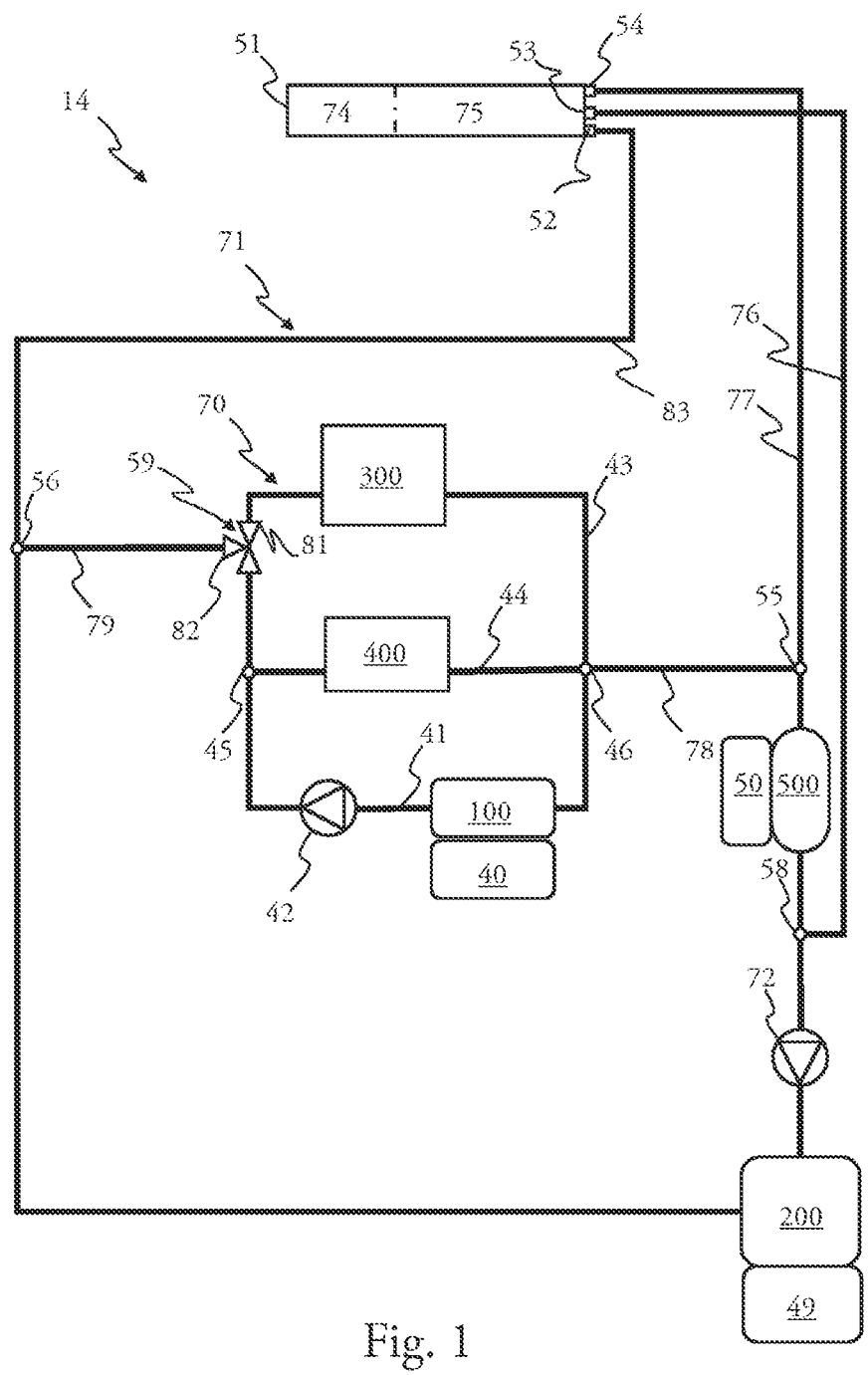

connected to the second heat exchanger (200). Application to motor vehicles.

9 Claims, 5 Drawing Sheets

(51) Int. Cl.
*B60K 11/02* (2006.01)
*B60L 3/00* (2019.01)
*B60L 58/26* (2019.01)

(52) U.S. Cl.
CPC ........ *B60L 58/26* (2019.02); *B60K 2001/003* (2013.01); *B60L 2240/36* (2013.01); *B60L 2240/425* (2013.01); *B60L 2240/545* (2013.01)

(58) Field of Classification Search
CPC ..... B60L 2240/545; B60K 1/00; B60K 11/02; B60K 2001/003
USPC .......................................................... 165/41
See application file for complete search history.

HEAT TRANSFER LIQUID LOOP FOR A VEHICLE

The field of the present invention is that of heat treatment systems for electric vehicles, in particular heat-transfer liquid loops involved in the heat treatment of the elements of a motor vehicle electric drivetrain.

Electric motor vehicles are equipped with heat treatment systems used to cool various zones or various components of the vehicle. It is in particular known to use heat-transfer fluids and fluid refrigerants for cooling the elements of an electric drivetrain of the vehicle. The elements of the electric drivetrain that are targeted are an electric motor capable of moving the vehicle, an electrical storage device used for supplying energy to the electric motor, or else an electronic unit participating in the control of the elements of the electric drivetrain.

The electric motor vehicle benefits from an outside air flow supply during the rolling phase. This outside air flow, captured at the front of the vehicle, participates with other heat-transfer fluids in the heat exchanges carried out within the heat treatment system. The heat energy of the outside air flow is thus used to cool an element of the electric drivetrain.

The electrical storage device is an element of the drivetrain that needs to be treated differently depending on the requirements, these requirements being variable. The electrical storage device experiences moderate heating during the rolling phase. Its heating is substantially increased during the charge phases, and in particular during rapid charge. The rapid charge consists in charging the electrical storage device under a high voltage and a high amperage so as to charge the electrical storage device in a short time of a few minutes. This rapid charge implies a high degree of heating of the electrical storage device, which needs to be cooled.

The electronic unit is an element of the drivetrain that is sensitive to high temperatures. The tolerance of the electronic unit is also associated with its compactness: the more compact the electronic unit, the higher its sensitivity to heat. Conventionally, this element of the drivetrain deteriorates when it is subjected to temperatures exceeding 65° C. Now, in the context of the drivetrain, this temperature level can be easily reached, in particular in the rapid charge phase.

The possibility should also be considered that the occupants of the vehicle remain inside the vehicle for all or some of the aforementioned charge time. It is then also necessary to thermally treat the cabin during this rapid charge in order to maintain acceptable comfort conditions for the occupants. These two cooling demands imply a sizing of the system that does not make it very compatible with the constraints of current motor vehicles, in particular vehicles moved by an electric motor.

The technical problem therefore lies in the capability of combining the heat exchanges of the fluids running through the heat treatment system so as to limit the consumption of said system while appropriately treating the various elements of the vehicle electric drivetrain and the cabin.

The invention is inscribed within this context and proposes a technical solution which contributes to maintaining at least the electrical storage device and the electric motor below a threshold temperature by means of a heat-transfer liquid loop cleverly designed to dissipate heat generated by at least two elements of the electric drivetrain, simultaneously, and in spite of the different cooling requirements of these two elements of the electric drivetrain.

The subject of the invention is therefore a heat-transfer liquid loop for a vehicle, the heat-transfer liquid loop comprising at least a first network and a second network, the first network comprising at least one means for inducing circulation of the heat-transfer liquid, and a first heat exchanger configured to be thermally coupled to a first element of an electric drivetrain of the vehicle, the second network comprising at least one means for inducing movement of the heat-transfer liquid, a second heat exchanger configured to be thermally coupled to a second element of the electric drivetrain of the vehicle, and a radiator arranged to be traversed by an outside air flow external to a cabin of the vehicle, the radiator comprising at least one input, a first cooling zone for the heat-transfer liquid supplying a first output of the radiator, and a second cooling zone for the heat-transfer liquid supplying a second output of the radiator, the first output being connected to the first heat exchanger, and the second output being connected to the second heat exchanger.

The first network and the second network are organized such that the first heat exchanger and the second heat exchanger are in parallel to one another in the loop according to the invention.

The connection between the first output of the radiator and the first heat exchanger and the connection between the second output of the radiator and the second heat exchanger are direct, that is to say achieved by means of a duct which directly connects the components in question, or indirect, that is to say via a duct and via at least one component, for example the means for inducing circulation of the heat-transfer liquid.

The first element of the electric drivetrain is, for example, an electrical storage device of an electric motor. The electrical storage device can be a battery or a battery pack and is configured to supply electrical energy to the electric motor of the vehicle.

The second element of the electric drivetrain is, for example, an electric motor capable of moving the vehicle. The electric motor of the vehicle is then a drive motor.

The first network and the second network each benefit from the radiator. The first network benefits from the first cooling zone. The second network benefits from the second cooling zone. The first element of the electric drivetrain of the first network is configured to be thermally treated by the heat-transfer liquid emanating from the radiator, just like the second element of the electric drivetrain of the second network, via the first heat exchanger and the second heat exchanger, respectively.

The radiator is a heat exchanger between the heat-transfer liquid and the outside air flow. The radiator comprises two separate cooling zones, each connected to a separate output of the radiator They are able to generate two different cooling temperatures. The different cooling temperatures derive, for example, from different exposure times between the heat-transfer liquid and the outside air flow in the one and the other cooling zone. A longer exposure time can result from a reduction in the flow rate in the zone having the higher cooling temperature, or by different sizing or different organization that generates a longer course for the heat-transfer liquid within the cooling zone having the higher cooling temperature.

The first cooling zone of the radiator is connected to the first network via the first output of the radiator. The second cooling zone of the radiator is connected to the second network via the second output of the radiator. The heat exchanges carried out in the radiator are thus combined in order to be able to benefit the first network and the second network.

The first network and the second network are to be understood as being heat-transfer liquid networks made up of ducts.

According to one aspect of the invention, the first cooling zone is able to generate a first temperature of the heat-transfer liquid, and the second cooling zone is able to generate a second temperature of the heat-transfer liquid, the first temperature being higher than the second temperature. Consequently, the first heat exchanger benefits from a heat-transfer liquid cooled more than the heat-transfer liquid intended for the second heat exchanger.

According to one aspect of the invention, the first network comprises a third heat exchanger and/or a fourth heat exchanger, both being configured to be thermally coupled to a refrigerant circuit, the third heat exchanger and/or the fourth heat exchanger being arranged between a first connection point and a second connection point.

The third heat exchanger and the fourth heat exchanger are dedicated to the heat treatment of the first element of the electric drivetrain. The third heat exchanger and the fourth heat exchanger are adapted to the heat treatment of the first element of the electric drivetrain corresponding to the electrical storage device for which a rapid charge is applied. Depending on the cooling power required at the electrical storage device, the one and/or the other of the third heat exchanger and the fourth exchanger can be employed, and this may or may not be in conjunction with the radiator.

The third heat exchanger and the fourth heat exchanger are each individualized in the sense that they can be positioned in the vehicle at separate places, being physically distant from one another.

In the first network, the heat-transfer liquid can be cooled by virtue of the refrigerant traversing the third heat exchanger and/or the fourth heat exchanger. In the second network, the heat-transfer liquid can be cooled by virtue of the outside air flow traversing the radiator when the vehicle is in the rolling phase.

In the heat-transfer liquid loop, the first element of the electric drivetrain is cooled by the radiator and/or the third heat exchanger and/or the fourth heat exchanger, via the first heat exchanger.

According to one aspect of the invention, the third heat exchanger and the fourth heat exchanger are in parallel to one another in the first network between the first connection point and the second connection point.

According to one aspect of the invention, the second network comprises a fifth connection point, where there meet a first path and a second path arranged in parallel to one another in the second network, the first path extending between the first output of the radiator and the fifth connection point, and the second path extending between the second output of the radiator and the fifth connection point.

The fifth connection point is a convergence point for the heat-transfer liquid emanating from the first output and from the second output of the radiator. The fifth connection point supplies the second heat exchanger arranged between the fifth connection point and the input of the radiator. The movement-inducing means is, for example, situated between the fifth connection point and the second heat exchanger.

According to one aspect of the invention, the first network and the second network are connected by a first connection duct which extends from a third connection point, arranged in the first path, to the second connection point. The first network and the second network are connected to one another so as to allow an exchange of heat-transfer liquid from one network to the other.

The first connection duct is classed as an input or output path for the heat-transfer liquid into the first network, from the first path of the second network. In the first connection duct, the heat-transfer liquid can circulate alternatively in both directions, from the third connection point toward the second connection point, and vice versa.

The third connection point is a divergence point for the heat-transfer liquid emanating from the first cooling zone. It supplies the second connection point on the one hand and the fifth connection point on the other hand.

According to one aspect of the invention, the second network comprises a fifth heat exchanger configured to be thermally coupled to a third element of the electric drivetrain.

The third element of the electric drivetrain is, for example, an electronic unit. The electronic unit is an assembly of electronic devices or programs, or a module of this assembly, able to control at least one of the elements of the electric drivetrain of the vehicle and; or at least one of the elements of the heat-transfer liquid loop and/or at least one of the elements of the refrigerant circuit. For example, the electronic unit controls the electric motor or the charging/discharging of the electrical storage device.

According to one aspect of the invention, the fifth heat exchanger is arranged between the third connection point and the fifth connection point. From the third connection point, the heat-transfer liquid can be oriented toward the fifth heat exchanger on the one hand and toward the first network on the other hand. The third element of the drivetrain is thus configured to be cooled at least by the radiator.

According to one aspect of the invention, the first network and the second network are connected by a second connection duct which extends from a three-way valve, arranged in the first network, to a fourth connection point contained in the second network between the input of the radiator and the second heat exchanger. The second connection duct connects the first network and the second network. The second connection duct is classed as an output path of the heat-transfer liquid from the first network toward the second network. In the second connection duct, the heat-transfer liquid circulates in only one direction, from the three-way valve toward the fourth connection point.

The three-way valve is a divergence point for the heat-transfer liquid. The fourth connection point is a convergence point for the heat-transfer liquid. The three-way valve is configured to allow the heat-transfer liquid to circulate, and to prevent it from circulating, from the first network toward the second network. This circulation, from the first network toward the second network, takes place via the second connection duct. When the three-way valve allows this circulation of the heat-transfer liquid, the heat-transfer liquid is combined in the first network and the second network. Then, the heat-transfer liquid traverses the first connection duct and the second connection duct.

When the second connection duct prevents the heat-transfer liquid from circulating from the first network toward the second network, the heat-transfer liquid circulates, on the one hand, in the first network and, on the other hand, in the second network without there being any circulation of heat-transfer liquid between them. The heat-transfer liquid circulates neither in the second connection duct nor in the first connection duct. The heat-transfer liquid circulates in the first network by virtue of the circulation-inducing means. The heat-transfer liquid circulates in the second network by virtue of the movement-inducing means.

According to one aspect of the invention, the second heat exchanger is arranged between the fifth connection point and the fourth connection point. The second heat exchanger is thus able to be supplied by the first output and the second output of the radiator.

According to one aspect of the invention, the three-way valve is arranged between the first connection point and the first heat exchanger.

The three-way valve comprises one input and two outputs which can be independently opened or closed. The input of the three-way valve is connected to the first connection point. A first output of the three-way valve supplies the third heat exchanger. A second output of the three-way valve supplies the second connection duct.

Alternatively, the three-way valve comprises one input and two outputs having interdependent opening and closing.

When the first output of the three-way valve is closed, the third heat exchanger is inoperative. When the first output of the three-way valve is opened, the heat-transfer liquid circulates through the third heat exchanger.

When the second output of the three-way valve is closed, the circulation between the first network and the second network via the second connection duct is prevented. When the second output of the three-way valve is opened, the circulation between the first network and the second network via the second connection duct is allowed.

According to one aspect of the invention, the means for inducing movement of the heat-transfer liquid generates a maximum flow rate of heat-transfer liquid that is less than the maximum flow rate generated by the means for inducing circulation of the heat-transfer liquid. When the circulation of heat-transfer liquid is prevented in the second connection duct, the circulation of the heat-transfer liquid is confined in the first network on the one hand and in the second network on the other hand. What is to be understood by "confine" is that the first network and the second network are, in the scenario of a circulation being prevented in the second connection duct, configured to block or limit the circulation of heat-transfer liquid in the first connection duct. The flow rates generated in the one and the other of the networks contribute to this confinement.

According to one aspect of the invention, the first network and the second network are connected by a third connection duct which extends between a sixth connection point, arranged in the first network between the three-way valve and the first connection point, and a three-way valve contained in the second network between the fourth connection point and the second heat exchanger. The third connection duct connects the second network and the first network. The second connection duct is classed as an output path for the heat-transfer liquid from the second network toward the first network. In the third connection duct, the heat-transfer liquid circulates in only one direction, from the three-way valve toward the sixth connection point.

According to one aspect of the invention, the three-way valve is arranged between the fourth connection point and the second element of the electric drivetrain.

According to one aspect of the invention, a non-return valve is arranged between the first connection point and the sixth connection point. The non-return valve is arranged in the first network. It imposes a direction of circulation on the heat-transfer liquid in the first network, from the first connection point toward the sixth connection point. The circulation of the heat-transfer liquid in the opposite direction is prevented.

The invention also relates to a heat treatment system of a vehicle, the system being intended for the heat treatment of at least the first element of the electric drivetrain and of the second element of the electric drivetrain, the system comprising at least the heat-transfer liquid loop, as described above, and a refrigerant circuit dedicated to the heat treatment of the first element of the electric drivetrain.

The third heat exchanger and/or the fourth heat exchanger are coupled both to the heat-transfer liquid loop and to the refrigerant loop. They are configured to thermally treat, by way of the refrigerant, at least the first element of the electric drivetrain, doing so by virtue of the first heat exchanger. The third heat exchanger and the fourth heat exchanger both allow an exchange of heat between the refrigerant and the heat-transfer liquid.

The refrigerant circuit according to the invention is a closed circuit which implements a thermodynamic cycle. The refrigerant is, for example, a subcritical fluid, as known under reference R134A or R1234YF.

Figure 2:
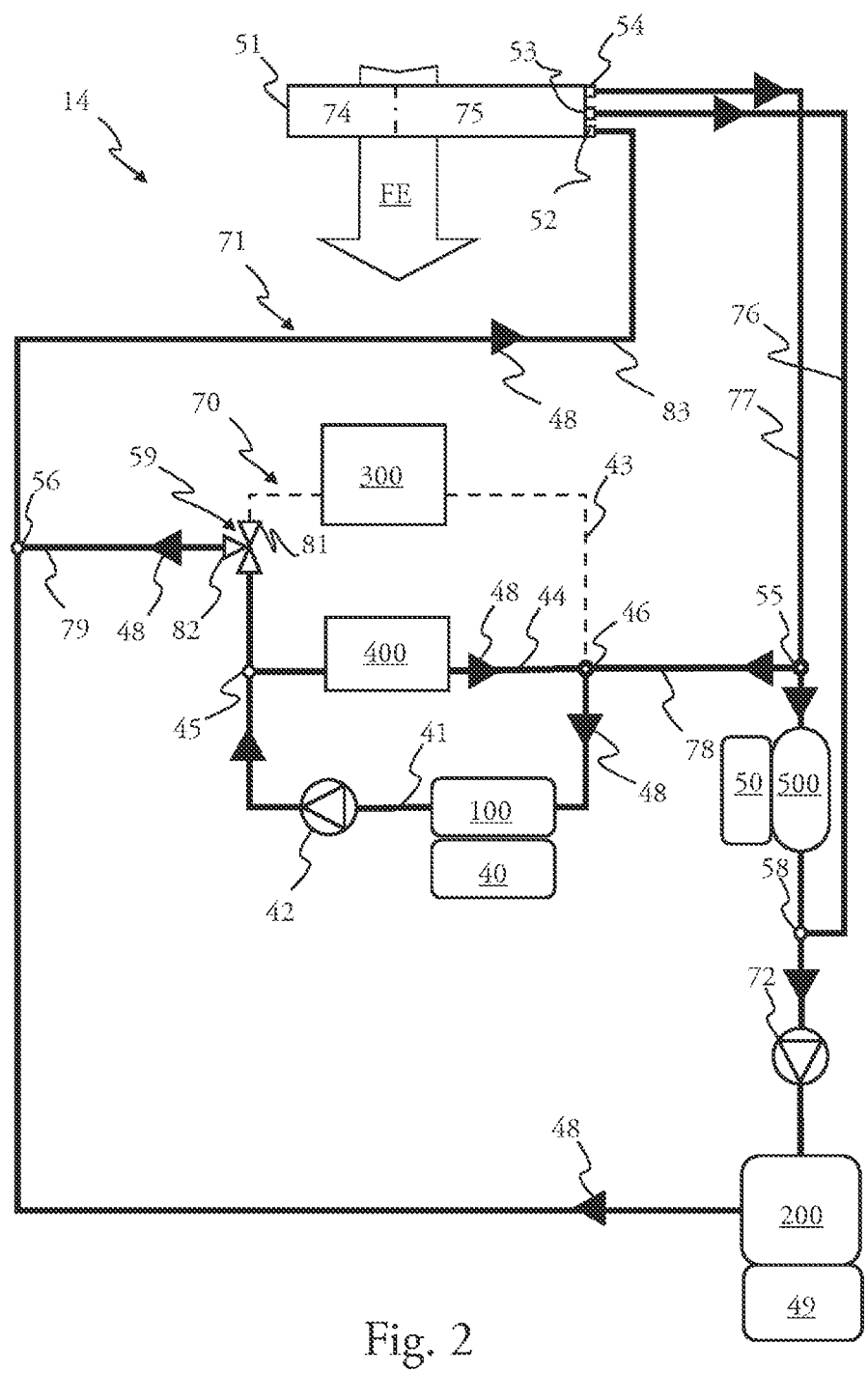
Figure 3:
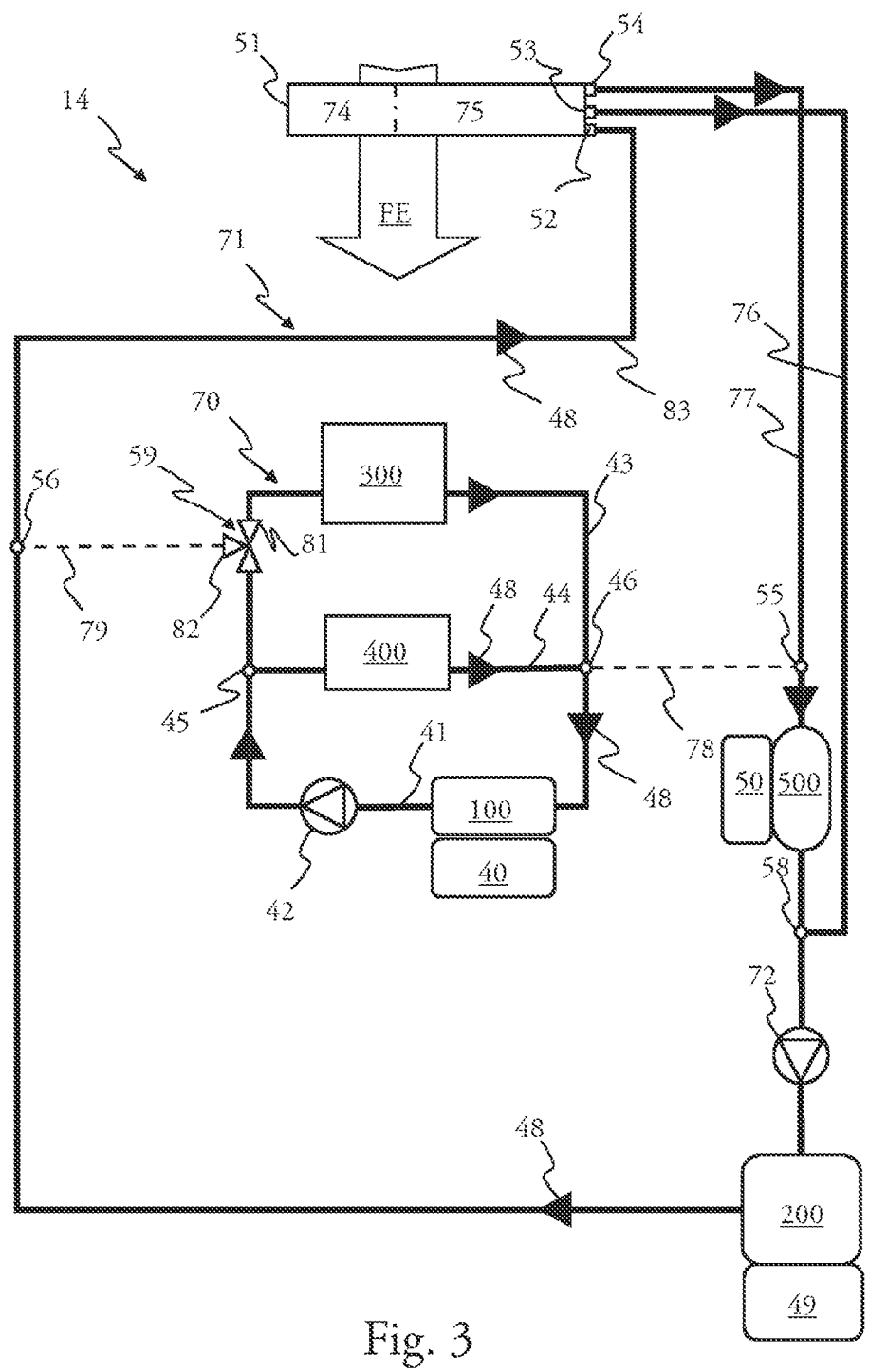
Figure 4:
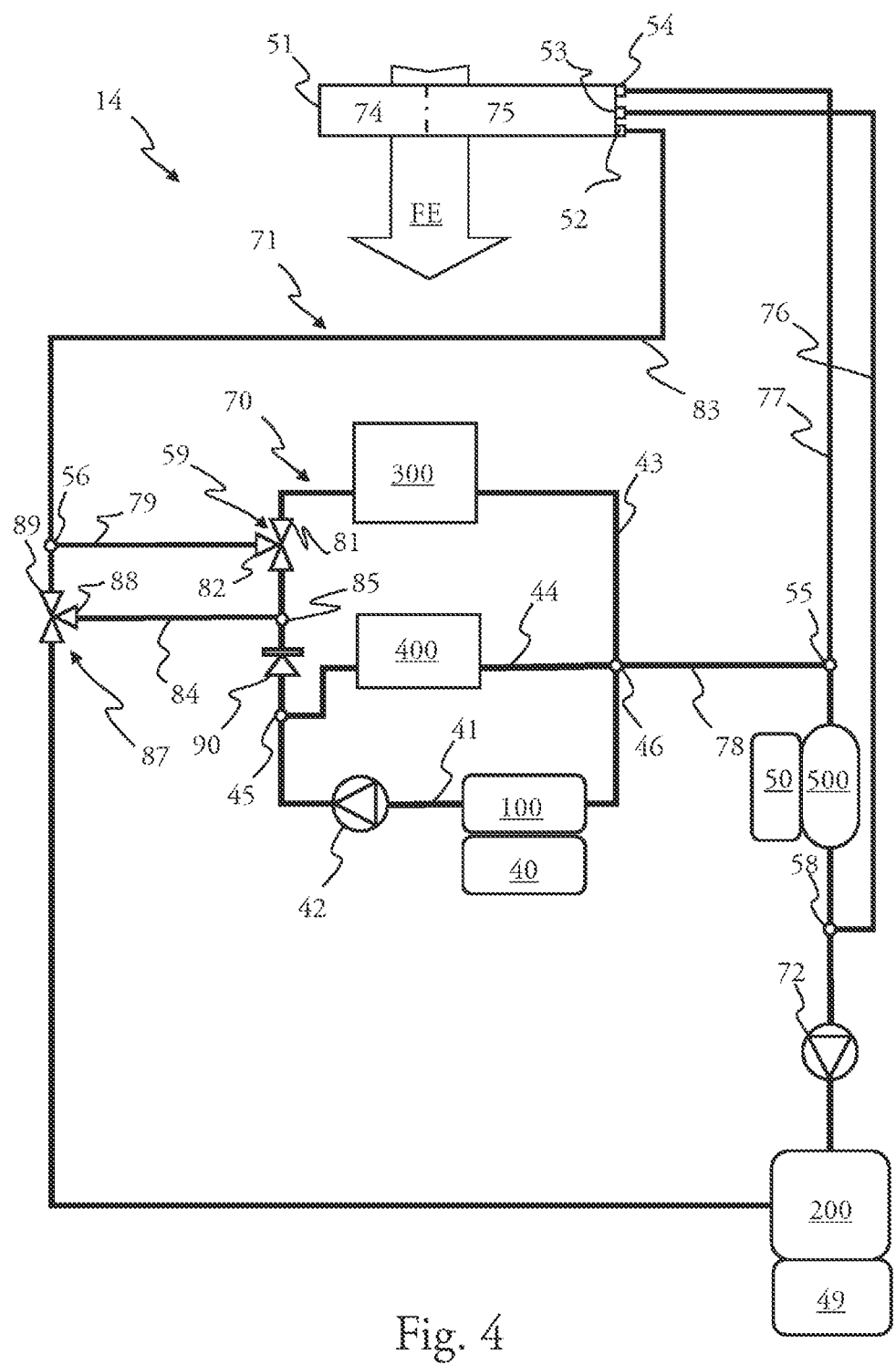
Figure 5:
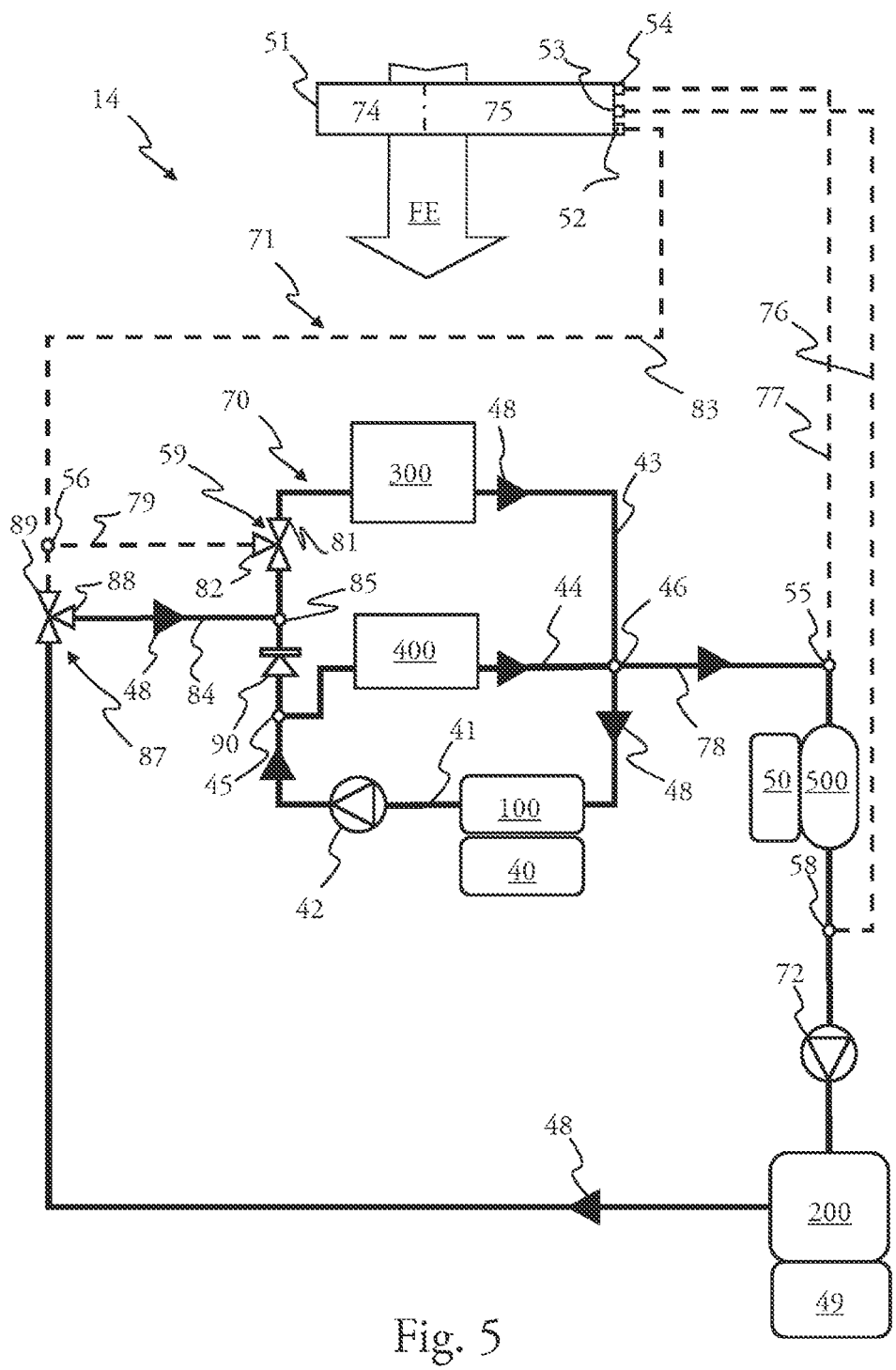

Further features, details and advantages of the invention will become more clearly apparent from reading the description, which is provided hereinafter for indicative purposes, with reference to the drawings, in which:

FIG. 1 is a schematic view of a loop according to the invention in a first embodiment, FIGS. 2 and 3 show the loop of FIG. 1 as used according to various operating modes consisting in cooling elements of an electric drivetrain of the vehicle, FIG. 4 is a schematic view of a loop according to the invention in a second embodiment, FIG. 5 shows the loop of FIG. 4 as used according to an operating mode consisting in cooling the elements of the electric drivetrain of the vehicle.

It should be noted first of all that the figures explain the invention in a detailed manner in order to implement the invention, said figures of course being able to serve to better define the invention, where appropriate. These figures are schematic representations which illustrate how the loop is realized, what composes it and how the heat-transfer liquid circulates within it. In particular, the loop according to the invention mainly comprises means for inducing circulation of the heat-transfer liquid in the loop, heat exchangers, a radiator arranged to be traversed by an outside air flow external to a cabin of the vehicle, and pipes connecting each of these components.

The terms upstream and downstream as used in the description which follows refer to the direction of circulation of the fluid in question, that is to say of the heat-transfer liquid or an outside air flow external to the cabin of the vehicle. The heat-transfer liquid is symbolized by an arrow which illustrates the direction of circulation thereof in the pipe in question. The solid lines illustrate a circuit portion where the heat-transfer liquid circulates, whereas the dashed lines show an absence of circulation of the heat-transfer liquid.

The designations "main", "first", "second", etc., are not intended to indicate a level of hierarchy or to order the terms that they accompany. These designations make it possible to distinguish the terms that they accompany and can be interchanged without affecting the scope of the invention.

FIG. 1 thus shows a heat-transfer liquid loop 14. This loop 14 is closed and comprises a first network 70 and a second network 71. In this loop 14, a heat-transfer liquid can be induced to circulate by a circulation-inducing means 42 and by a movement-inducing means 72. The first network 70 is a branch which is connected to the second network 71.

The circulation-inducing means 42 and the movement-inducing means 72 are devices, such as a pump, able to allow the circulation of the heat-transfer liquid.

The first network 70 comprises at least the means 42 for inducing circulation of the heat-transfer liquid, and a first heat exchanger 100 dedicated to the heat treatment of a first element 40 of the electric drivetrain of the vehicle. The refrigerant circuit is not shown here in order to make it easier to read the figure.

The first heat exchanger 100 is thermally coupled, indirectly, to the refrigerant circuit by a third heat exchanger 300 and/or by a fourth heat exchanger 400. The first network 70 thus comprises the third heat exchanger 300 and the fourth heat exchanger 400, which both couple the heat-transfer liquid loop 14 to the refrigerant circuit.

The third heat exchanger 300 and the fourth heat exchanger 400 are in parallel to one another in the first network 70. The third heat exchanger 300 is arranged in a first conduit 43. The fourth heat exchanger 400 is arranged in a second conduit 44. The first conduit 43 and the second conduit 44 each extend between a first connection point 45 and a second connection point 46. The first conduit 43 and the second conduit 44 are connected to one another by a main conduit 41. The main conduit 41 extends between the first connection point 45 and the second connection point 46. The first heat exchanger 100 is arranged in the main conduit 41 of the first network 70. The first heat exchanger 100 is in parallel to the third heat exchanger 300 and to the fourth heat exchanger 400.

The third heat exchanger 300 and the fourth heat exchanger 400 both allow an exchange of heat between the refrigerant and the first element 40 of the electric drivetrain, indirectly via the first heat exchanger 100. The first element 40 of the electric drivetrain is used to supply electrical energy to an electric motor 49 capable of causing movement of the vehicle. The first element 40 of the electric drivetrain is an electrical energy storage device, for example a battery or a battery pack.

The means 42 for inducing circulation of the heat-transfer liquid is arranged between the first heat exchanger 100 and the first connection point 45.

The second network 71 comprises at least the means 72 for inducing movement of the heat-transfer liquid, a second heat exchanger 200 able to thermally treat the second element 49 of the electric drivetrain, and a radiator 51 arranged to be traversed by an outside air flow external to a cabin of the vehicle. From the point of view of the heat-transfer liquid, the second heat exchanger 200 is downstream of the movement-inducing means 72 and is upstream of the radiator 51. The radiator 51 is arranged in the front end of the vehicle in order to be able to benefit from the outside air flow when the vehicle is in the rolling phase. The second element 49 of the electric drivetrain is, for example, an electric traction or propulsion motor of the vehicle.

The radiator 51 is able to generate two temperature levels for the heat-transfer liquid within it. The radiator 51 comprises for that purpose an input 52, a first output 54 and a second output 53, the one and the other being parallel. The second output 53 is able to dispense the heat-transfer liquid at a first temperature level, and the first output 54 is able to dispense the heat-transfer liquid at a second temperature level different than the first temperature level. The second output 53 is able to supply the second element 49 of the electric drivetrain, benefiting from the first temperature level. The first output 54 is able to supply the first heat exchanger 100 and/or a fifth heat exchanger 500, benefiting from the second temperature level.

The radiator 51 comprises a first cooling zone 74 for the heat-transfer liquid supplying a first path 77 of the second network 71. The first cooling zone 74 supplies heat-transfer liquid to the first output 54 of the radiator 51. The first cooling zone 74 is assigned to the heat treatment of at least the first element 40 of the electric drivetrain. The first cooling zone 74 is able to generate a higher degree of cooling of the heat-transfer liquid than the second cooling zone 75.

The radiator 51 comprises a second cooling zone 75 for the heat-transfer liquid supplying the second network 71 in a second path 76 of the second network 71. The first path 77 and the second path 76 of the second network 71 are arranged in parallel to one another. The second cooling zone 75 supplies heat-transfer liquid to the second output 53 of the radiator 51. The second cooling zone 75 is assigned to the heat treatment of the electric motor 49. The first cooling zone 74 and the second cooling zone 75 are configured to be traversed by the outside air flow.

A first connection duct 78 connects the first network 70 and the second network 71. The first connection duct 78 extends between a third connection point 55, arranged in the first path 77 of the second network 71, and the second connection point 46, arranged in the first network 70. The first connection duct 78 is configured such that the heat-transfer liquid circulates therein from the third connection point 55 toward the second connection point 46.

A second connection duct 79 connects the first network 70 and the second network 71. The second connection duct 79 extends between a three-way valve 59, arranged in the first network 70, and a fourth connection point 56 contained in the second network 71. The three-way valve 87 is configured to allow the heat-transfer liquid to circulate, and to prevent it from circulating, from the first network 70 toward the second network 71. The fourth connection point 56 is arranged between the second heat exchanger 200 and the radiator 51.

In the first conduit 43, between the first connection point 45 and the third heat exchanger 300, is found the three-way valve 59, This three-way valve 59 is the device that allows the heat-transfer liquid to circulate, and that prevents it from circulating, from the first network 70 toward the second network 71.

The three-way valve 59 is a point at which the heat-transfer liquid 48 may diverge. A first output 81 of the three-way valve 59 is able to supply the third heat exchanger 300. A second output 82 of the three-way valve 59 is able to supply the second connection duct 79. The three-way valve 59 has arresting functions able to prevent and allow the one and/or the other of these distributions. In other words, an arresting function equips the first output 81 and the second output 82 of the three-way valve 59.

The second network 71 is divided into paths 77, 76, 83, The first path 77 and the second path 76 are in series with a third path 83 extending between a fifth connection point 58 and the input 52 of the radiator 51. The third path 83 comprises the movement-inducing means 72, the second element 49 of the electric drivetrain, and the fourth connection point 56.

The first path 77 and the second path 76 extend between the radiator 51 and the fifth connection point 58. They are parallel to one another between the radiator 51 and the fifth connection point 58. The first cooling zone 74 of the radiator 51 supplies the first network 70 via the first connection duct 78, and the second network 71 via the fifth connection point 58. The first cooling zone 74 and the second cooling zone 75 of the radiator 51 supply the second heat exchanger 200 via the fifth connection point 58.

The second network 71 comprises the fifth heat exchanger 500 dedicated to the heat treatment of a third element 50 of the electric drivetrain, for example an electronic unit. The fifth heat exchanger 500 is arranged between the third connection point 55 and the fifth connection point 58. Thus, the first cooling zone 74 of the radiator 51 also supplies the fifth heat exchanger 500. Consequently, the first element 40 of the electric drivetrain and the third element 50 of the electric drivetrain can both benefit from a heat-transfer liquid cooled more than the second element 49 of the electric drivetrain.

FIG. 2 shows a situation in which the vehicle is in a rolling phase with an operating mode in which the heat-transfer liquid 48 circulates between the first network 70 and the second network 71. This situation represents a cooling of the first element 40 of the electric drivetrain by the outside air flow FE, not requiring the operation of the third heat exchanger 300 or of the fourth heat exchanger 400, rendered inoperative. For example, this operating mode is possible when the outside air is at a temperature of 30° C. and when the first element 40 of the electric drivetrain is at a temperature of 45° C. The refrigerant circuit can be used in parallel in order to cool the first element 40 of the electric drivetrain in the case where the codling by the outside air flow FE is insufficient. This situation arises, for example, when the first element 40 of the electric drivetrain is at a higher temperature. In the operating mode described in FIG. 2, the cooling of the first element 40 of the electric drivetrain by the radiator 51 is performed by means of the first cooling zone 74. The heat energy released, in the rolling phase, by the second element 49 of the electric drivetrain is dissipated in the outside air flow FE, via the second cooling zone 75.

In FIG. 2, the heat-transfer liquid 48 circulates in the first network 70 through the main conduit 41, from the circulation-inducing means 42. At the first connection point 45, the heat-transfer liquid 48 is divided in order to reach the three-way valve 59 on the one hand and the second conduit 44 on the other hand.

In the second conduit 44, the heat-transfer liquid 48 traverses the fourth heat exchanger 400. When the fourth heat exchanger 400 does not simultaneously have the refrigerant running through it, there is no heat exchange at this level. The heat-transfer liquid 48 reaches the second connection point 46, where it mixes with the heat-transfer liquid 48 cooled by the outside air flow FE, emanating from the first connection duct 78, as described below.

The three-way valve 59 has its first output 81 closed, preventing the circulation of the heat-transfer liquid in the third heat exchanger 300. The three-way valve 59 has its second output 82 opened, allowing the circulation of the heat-transfer liquid 48 in the second connection duct 79. Thus, the heat-transfer liquid 48 reaches the fourth connection point 56 via the second connection duct 79.

From the fourth connection point 56, which is a point of convergence between the heat-transfer liquid 48 emanating from the second heat exchanger 200 and that emanating from the second connection duct 79, the heat-transfer liquid 48 enters the radiator 51 via its first input 52.

In the radiator 51, the heat-transfer liquid 48 is distributed between the first cooling zone 74 and the second cooling zone 75.

In the first cooling zone 74 and in the second cooling zone 75, the heat-transfer liquid 48 exchanges heat with the outside air flow FE which simultaneously traverses the radiator 51. The heat-transfer liquid 48 is cooled more efficiently in the first cooling zone 74 in relation to the cooling that occurs in the second cooling zone 75.

The heat-transfer liquid 48 exits the first cooling zone 74 via the first output 54 of the radiator 51. It then reaches the third connection point 55. At the third connection point 55, one fraction of the heat-transfer liquid 48 is entrained into the first network 70 by the circulation-inducing means 42. At the third connection point 55, another fraction of the heat-transfer liquid 48 is entrained into the second network 71 by the movement-inducing means 72, Thus, the most-cooled heat-transfer liquid 48 supplies, via the first connection duct 78 and the second connection point 46, the first heat exchanger 100 by entering the main conduit 41. In parallel, the most-cooled heat-transfer liquid 48 also supplies the fifth heat exchanger 500 arranged in the first path 77 downstream of the third connection point 55. The third element 50 of the electric drivetrain and the first element 40 of the electric drivetrain are thus cooled. From the fifth heat exchanger 500, the heat-transfer liquid 48 reaches the fifth connection point 58.

The heat-transfer liquid 48 exits the second cooling zone 75 via the second output 53 of the radiator 51. It runs through the second path 76 of the second network 71 up to the fifth connection point 58. The fifth connection point 58 is thus a mixing point for the heat-transfer liquid 48, which then enters the movement-inducing means 72. Then, the heat-transfer liquid 48 reaches the second heat exchanger 200 so as to cool the second element 49 of the electric drivetrain.

In the example of FIG. 2, the heat-transfer liquid 48 does not circulate between the first output 81 of the three-way valve 59 and the second connection point 46.

Referring now to FIG. 3, a situation can be seen in which the vehicle is in the rolling phase with an operating mode in which the heat-transfer liquid 48 circulates independently in the first network 70, on the one hand, and in the second network 71, on the other hand. When the temperature of the outside air flow FE is too high, the cooling of the first element 40 of the electric drivetrain is ensured by the refrigerant traversing the third heat exchanger 300 and/or the fourth heat exchanger 400. The cooling of the second element 49 and of the third element 50 of the electric drivetrain is achieved by the outside air flow FE, at different cooling levels, Specifically, the second exchanger 200 is supplied by the first output 54 of the radiator 51, whereas the fifth heat exchanger 500 is supplied with heat-transfer liquid by the second output 53 of the radiator 51.

In the first network 70, the heat-transfer liquid 48 circulates in the main conduit 41, in the first conduit 43 and in the second conduit 44, entrained by the circulation-inducing means 42. The first connection point 45 is a divergence point for the first network 70, supplying the third heat exchanger 300 on the one hand and the fourth heat exchanger 400 on the other hand. The second connection point 46 is a convergence point for the first network 70, supplied by the third heat exchanger 300 and by the fourth heat exchanger 400.

The fourth heat exchanger 400 is simultaneously run through by the low-pressure and low-temperature refrigerant and by the heat-transfer liquid 48. Within the fourth heat exchanger 400 there takes place a heat exchange between this refrigerant and the heat-transfer liquid 48, the latter being cooled. The third heat exchanger 300 can be operated in the same way. It can also be rendered inoperative, with no refrigerant running through it. The heat-transfer liquid 48 then circulates in the first conduit 43 without benefiting from heat exchange.

In the second network 71, the heat-transfer liquid 48 circulates in the third path 83, the first path 77 and the second path 76, entrained by the movement-inducing means 72. The heat-transfer liquid 48 circulates in the second network 71 as described in FIG. 2, and reference may be made thereto for the understanding and implementation of the invention. Thus, the first cooling zone 74 of the radiator 51 makes it possible to cool the third element 50 of the electric drivetrain and then the second element 49 of the electric drivetrain, and the second cooling zone 75 makes it possible to reinforce the cooling of the second element 49 of the electric drivetrain.

In the example of FIG. 3, the heat-transfer liquid 48 circulates neither in the first connection duct 78 nor in the second connection duct 79, on account of the closure of the second output 82 of the three-way valve 59. The heat-transfer liquid 48 is not divided at the third connection point 55, and the fourth connection point 56 is not a mixing point.

FIG. 4 illustrates a second embodiment of the loop 14 for heat-transfer liquid 48 according to the invention. The differences compared with what was described in FIG. 1 will be described below. With the exception of these differences, the description of figure applies mutates mutandis, and reference may be made thereto in order to implement the invention described in FIG. 4.

In the example of FIG. 4, the heat-transfer liquid loop 14 comprises a third connection duct 84. The third connection duct 84 connects the first network 70 to the second network 71. The third connection duct 84 extends between a sixth connection point 85 and a three-way valve 87.

The sixth connection point 85 is contained in the first network 70. The sixth connection point 85 is arranged between the first connection point 45 and the three-way valve 59, The sixth connection point 85 is arranged in the first conduit 43.

The three-way valve 87 is contained in the second network 71. The three-way valve 87 is arranged between the fourth connection point 56 and the second heat exchanger 200.

The three-way valve 87 comprises a first output 88 and a second output 89. The first output 88 supplies the third connection duct 84. The second output 89 supplies the radiator 51, via its input 52. The first output 88 and the second output 89 each have an arresting function. The three-way valve 87 allows the heat-transfer liquid 48 to exit, or prevents it from exiting, at its first output 88, from the second network 71 toward the first network 70, and, in this direction only, from the three-way valve 87 toward the sixth connection point 85.

A non-return valve 90 is arranged between the first connection point 45 and the sixth connection point 85. The non-return valve 90 is arranged in the first conduit 43. It imposes a direction of circulation on the heat-transfer liquid 48 in the first conduit 43, from the first connection point 45 toward the sixth connection point 85. The circulation of the heat-transfer liquid 48 in the opposite direction is prevented by the non-return valve 90.

FIG. 5 presents the loop 14 for heat-transfer liquid 48 in a heat recovery mode dispensing with the radiator 51. The loop 14 operates so as to homogenize the heat-transfer liquid 48, thus participating in distributing the heat energies and doing so at a low energy cost, since the heat recovery is passive. This loop 14 for heat-transfer liquid 48 is also capable of operating in parallel with the fourth heat exchanger 400 operating, that is to say in an active mode in which the low-temperature and low-pressure refrigerant traverses the fourth heat exchanger 400.

The circulation-inducing means 42 maintains the circulation of the heat-transfer liquid 48 in the first network 70 at the main conduit 41, the first conduit 43 and the second conduit 44. The sixth connection point 85 is a convergence point for the heat-transfer liquid 48.

The movement-inducing means 72 induces circulation of the heat-transfer liquid 48 in a part of the third path 83 so as to supply the second heat exchanger 200 and the first network 70. Downstream of the second heat exchanger 200, the heat-transfer liquid 48 is oriented by the three-way valve 87, which has its first output 88 opened and its second output 89 closed. Consequently, the heat-transfer liquid 48 enters the third connection duct 84 and reaches the sixth connection point 85 in the first network 70.

At the second connection point 46, the heat-transfer liquid 48, which has converged from the first conduit 43 and the second conduit 44, is distributed between the main conduit 41 and the first connection duct 78. In this exemplary embodiment, the heat-transfer liquid 48 circulates in the first connection duct 78 from the first connection point 45 up to the third connection point 55.

Between the third connection point 55 and the fifth connection point 58, the heat-transfer liquid 48 circulates in the first path 77 of the second network 71, before returning to the movement-inducing means 72.

In the example of FIG. 5, given the closure of the second output 89 of the three-way valve 87, the heat-transfer liquid 48 circulates neither in the first path 77, nor in the second path 76, nor in a part of the third path 83 between the second output 89 of the three-way valve 87 and the input of the radiator 51, nor in the radiator 51. It also does not circulate in the second connection duct 79.

It will be understood from the foregoing that the present invention thus makes it possible to ensure, in a simple manner and without excess consumption, the heat treatment of elements of an electric drivetrain of a vehicle, such as an electrical storage device, an electric drive motor of the vehicle, and an electronic unit controlling this electric motor. The exploitation of the heat energy supplied by the outside air flow external to the vehicle contributes to reducing the energy consumption of the heat-transfer liquid loop while benefiting the elements of the drivetrain.

The invention is by no means limited to the means and configurations described and illustrated herein, and it also extends to any equivalent means or configurations and to any technically operational combination of such means. In particular, the architecture of the heat-transfer liquid loop can be modified without harming the invention insofar as it performs in fine the functionalities described in the present document.

The invention claimed is:

1. A loop for heat-transfer liquid for a vehicle, the loop for heat-transfer liquid comprising:
   at least a first network, and
   a second network,
   wherein the first network comprises a first pump configured to induce circulation of the heat-transfer liquid, and a first heat exchanger configured to be thermally coupled to a first element of an electric drivetrain of the vehicle;
   wherein the second network comprises a second pump configured to induce movement of the heat-transfer liquid, a second heat exchanger configured to be thermally coupled to a second element of the electric drivetrain of the vehicle, and a radiator arranged to be traversed by an outside air flow external to a cabin of the vehicle;
   wherein the radiator comprises at least one input, a first cooling zone for the heat-transfer liquid supplying a first output of the radiator, and a second cooling zone for the heat-transfer liquid supplying a second output of the radiator, the first output being connected to the first heat exchanger, and the second output being connected to the second heat exchanger, and wherein the first network and the second network are connected by a connection duct which extends from a valve, arranged in the first network, to a connection point contained in the second network between the at least one input of the radiator and the second heat exchanger.

2. The loop for heat-transfer liquid as claimed in claim 1, in which the first cooling zone is able to generate a first temperature of the heat-transfer liquid, and the second cooling zone is able to generate a second temperature of the heat-transfer liquid, the first temperature being higher than the second temperature.

3. The loop for heat-transfer liquid as claimed in claim 1, in which the first network comprises a third heat exchanger and a fourth heat exchanger, both being configured to be thermally coupled to a refrigerant circuit, the third heat exchanger and the fourth heat exchanger being arranged between two connection points.

4. The loop for heat-transfer liquid as claimed in claim 1, in which the second network comprises another connection point disposed where a first path and a second path meet in the second network, the first path extending between the first output of the radiator and the another connection point, disposed where the first path and the second path meet in the second network, and the second path extending between the second output of the radiator and the another connection point disposed where the first path and the second path meet in the second network.

5. The loop for heat-transfer liquid as claimed in claim 3, in which the first network and the second network are connected by another connection duct which extends from an additional connection point, arranged in a first path, to one of the two connection points.

6. The loop for heat-transfer liquid as claimed in claim 3, in which the second network comprises a fifth heat exchanger configured to be thermally coupled to a third element of the electric drivetrain.

7. The loop for heat-transfer liquid as claimed in claim 6, in which the fifth heat exchanger is arranged between an additional connection point and another connection point.

8. The loop for heat-transfer liquid as claimed in claim 1, in which the first network and the second network are connected by an additional connection duct which extends between a further connection point, arranged in the first network between the valve and one of two connection points, and an additional valve contained in the second network between the connection point, contained in the second network between the at least one input of the radiator and the second heat exchanger, and the second heat exchanger.

9. A heat treatment system for a vehicle, for a heat treatment of at least a first element of an electric drivetrain and of a second element of the electric drivetrain, the heat treatment system comprising:
at least a loop for heat-transfer liquid comprising:
at least a first network, and
a second network,
wherein the first network comprises a first pump configured to induce circulation of the heat-transfer liquid, and a first heat exchanger configured to be thermally coupled to the first element of the electric drivetrain of the vehicle;
wherein the second network comprises a second pump configured to induce movement of the heat-transfer liquid, a second heat exchanger configured to be thermally coupled to the second element of the electric drivetrain of the vehicle, and a radiator arranged to be traversed by an outside air flow external to a cabin of the vehicle;
wherein the radiator comprises at least one input, a first cooling zone for the heat-transfer liquid supplying a first output of the radiator, and a second cooling zone for the heat-transfer liquid supplying a second output of the radiator, the first output being connected to the first heat exchanger, and the second output being connected to the second heat exchanger, and
wherein the first network and the second network are connected by a connection duct which extends from a valve, arranged in the first network, to a connection point contained in the second network between the at least one input of the radiator and the second heat exchanger,
a refrigerant circuit dedicated to the heat treatment of the first element of the electric drivetrain.

* * * * *